US006372990B1

(12) United States Patent
Saito et al.

(10) Patent No.: US 6,372,990 B1
(45) Date of Patent: Apr. 16, 2002

(54) TERMINAL FOR A CABLE AND METHOD FOR MOUNTING A TERMINAL

(75) Inventors: Masashi Saito; Takashi Koide; Masahiko Aoyama, all of Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/567,692

(22) Filed: May 9, 2000

(30) Foreign Application Priority Data

May 10, 1999 (JP) ........................................ 11-128963

(51) Int. Cl.[7] ........................................ H02G 15/02
(52) U.S. Cl. .................. 174/74 R; 174/75 C; 174/84 C
(58) Field of Search ............................ 174/21 C, 84 R, 174/84 C, 74 R, 75 C, 78; 439/585

(56) References Cited

U.S. PATENT DOCUMENTS

| | | | | | |
|---|---|---|---|---|---|
| 3,383,457 A | | 5/1968 | Schumacher et al. | ...... | 174/68.5 |
| 3,670,293 A | * | 6/1972 | Garver | ...... | 339/177 |
| 3,743,748 A | * | 7/1973 | Reeder | ...... | 174/75 C |
| 4,178,054 A | | 12/1979 | Laudig | ...... | 339/95 R |
| 4,269,469 A | * | 5/1981 | Audic | ...... | 339/177 R |
| 5,059,140 A | * | 10/1991 | Philippson et al. | ...... | 439/607 |
| 5,133,677 A | * | 7/1992 | Sato et al. | ...... | 439/585 |
| 5,169,340 A | * | 12/1992 | Nakata et al. | ...... | 439/607 |
| 5,171,166 A | * | 12/1992 | Sato et al. | ...... | 439/578 |
| 5,429,529 A | * | 7/1995 | Hasizawa et al. | ...... | 439/610 |
| 5,603,636 A | * | 2/1997 | Kanou et al. | ...... | 439/585 |
| 5,989,080 A | * | 11/1999 | Tsuji et al. | ...... | 439/884 |
| 6,039,605 A | * | 3/2000 | Tanaka | ...... | 439/610 |
| 6,059,616 A | * | 5/2000 | Bluemmel et al. | ...... | 439/867 |
| 6,175,080 B1 | * | 1/2001 | Nightingale | ...... | 174/75 C |

FOREIGN PATENT DOCUMENTS

| | | | |
|---|---|---|---|
| DE | 88 14 033 | 2/1989 | |
| EP | 0624928 A1 * | 11/1994 | ......... H01R/13/658 |
| JP | 5-290249 | 11/1993 | |
| JP | 8-186414 | 7/1996 | |

* cited by examiner

*Primary Examiner*—Dean A. Reichard
*Assistant Examiner*—William H. Mayo, III
(74) *Attorney, Agent, or Firm*—Anthony J. Casella; Gerald E. Hespos

(57) ABSTRACT

A terminal is provided for stable mounting at a predetermined position of the leading end of a coaxial cable. The terminal 1 has rear side formed with a barrel 7 to be crimped into connection with the coaxial cable 2. A cover 11 is integrally provided before the barrel 7 for covering an exposed section of a core 3 of the coaxial cable 2. An embossed positioning portion 12 is formed between the barrel 7 and the cover 11. When the terminal 1 is mounted on a stripped end of the cable 2, the front end of a folded section 5A contacts a locking edge 12C of the positioning portion 12, thereby restricting any further insertion of the coaxial cable 2. Thus, the terminal 1 can be automatically positioned on the coaxial cable 2 with respect to the longitudinal direction of the coaxial cable 2.

7 Claims, 11 Drawing Sheets

TERMINAL FOR A CABLE AND METHOD FOR MOUNTING A TERMINAL

BACKGROUND OF THE INVENTION

1. Field of the Invention

The present invention relates to a terminal for a coaxial cable and to a method for mounting such a terminal on a cable.

2. Description of the Related Art

Coaxial cables have been used for many purposes, including the transmission of high-frequency signals. The prior art coaxial cable includes a core, an inner insulation coating surrounding the core, a braided wire surrounding the inner insulation coating, and an outer insulation coating surrounding the braided wire. The prior art coaxial cable may be coupled to a printed circuit board. In this environment, the prior art coaxial cable is processed such that the core projects from a leading end of the inner insulation coating and the braided wire is folded back around the outer surface of the outer insulation coating at the end of the coaxial cable. A terminal is connected to the braided wire and enables connection of the coaxial cable to the printed circuit board. The terminal is provided with a barrel that is dimensioned to receive the coaxial cable. The cable is pushed into the barrel of the terminal, and the barrel is crimped into engagement with the cable.

The prior art terminals for the coaxial cables have no positioning means for positioning the terminal on the coaxial cable with respect to the longitudinal direction of the coaxial cable. Thus, the mount positions of the terminals may vary along the longitudinal direction, thereby causing a variation of high-frequency characteristics.

In view of the above, an object of the present invention is to provide a terminal for a cable, and to a method for connecting such a terminal to allow for a stable mounting of the terminal at a predetermined position on a leading end of the cable.

SUMMARY OF THE INVENTION

The subject invention is directed to a terminal that is mountable on a cable. The cable is comprised of a core and an insulation coating surrounding the core. A portion of the insulation coating is removed so that the core projects from the leading end of the insulation coating. The terminal comprises a barrel to be crimped into connection with a portion of the cable. The terminal further comprises a positioning portion to be held substantially in engagement with the cable. The positioning portion positions the terminal on the cable with respect to the longitudinal direction of the cable before the barrel is crimped into connection with the portion of the cable.

The terminal may be mountable on a coaxial cable comprised of a core surrounded by an inner insulation coating. The coaxial cable may be processed such that the core projects from the leading end of the inner insulation coating. The coaxial cable further comprises a shield layer in the form of a braided wire that surrounds the inner insulation coating, and an outer insulation coating that surrounds the braided wire. The braided wire that surrounds the inner insulation coating is folded back at least partly and is brought substantially into close contact with the outer surface of the outer insulation coating. The barrel portion is configured for crimped connection with a folded section of the shield layer of the coaxial cable.

The terminal may further comprise a cover that extends substantially continuously from the barrel portion to substantially cover the exposed core without being held in contact therewith.

According to a further preferred embodiment of the invention, the terminal may be mountable on a coaxial cable comprised of a core and an inner insulation coating surrounding the core. The coaxial cable is processed such that the core projects from the leading end of the inner insulation coating. The coaxial cable further comprises a braided wire surrounding the inner insulation coating and an outer insulation coating surrounding the braided wire. The braided wire is folded back and brought into close contact with the outer surface of the outer insulation coating. The terminal comprises a barrel for crimped connection with the folded section of the braided wire. A cover extends continuously from the barrel and covers the core without being held in contact therewith. The terminal further comprises a positioning portion to be held in engagement with the coaxial cable for positioning the terminal on the coaxial cable with respect to the longitudinal direction of the coaxial cable.

Accordingly, when the terminal is mounted on the coaxial cable, the positioning portion is brought into contact with the coaxial cable to position the terminal with respect to the longitudinal direction of the coaxial cable. The barrel then is crimped into connection with the folded section of the braided wire in this state, with the result that the terminal can be stably mounted at a predetermined position on the coaxial cable. Since the terminal is stably mounted and the cover covers the core over a predetermined length, an electrical capacity between the core and the terminal is stabilized, thereby providing stable high-frequency characteristics.

Preferably, the cover is integrally or unitarily formed with one or more legs for mounting the terminal on a printed circuit board. Accordingly, the legs of the cover enable the terminal to be mounted easily on the printed circuit board.

Preferably, the legs are provided with one or more embossed portions for strengthening the legs and/or for locking the legs in corresponding mount holes of the circuit board. The legs also may be provided with stepped portions that engage the circuit board upon insertion of the legs into mount holes of the printed circuit board.

The barrel may be formed with at least one inwardly projecting biting portion for biting in a portion of the cable, preferably in the braided wire of the shield layer. Accordingly, the biting portion bites into the braided wire when the barrel is crimped into connection with the braided wire, to further resist disengagement of the barrel from the coaxial cable.

A projection of the biting portion may be shorter than the positioning portion to prevent the biting portion from interfering with the insertion of the cable into the terminal. Accordingly, the coaxial cable can be inserted smoothly into the terminal without interference with the biting portion.

Most preferably, the terminal is constructed such that the cable can be inserted along its longitudinal direction into the terminal from the barrel side up to the cover. The positioning portion is formed by cutting the cover and bending the cut portion to engage the front end of the outer insulation coating, which is a starting position of the folded section of the shield layer. Accordingly, when the cable is inserted into the terminal from the barrel side and the leading end of the positioning portion comes into contact with a portion of the folded section of the braided wire, any further insertion of the cable is restricted. As a result, the terminal can be positioned automatically on the cable with respect to the longitudinal direction of the cable.

According to a further preferred embodiment, the biting portion and the positioning portion are arranged substantially opposing to each other along an arrangement direction of the cable.

According to the invention, there is further provided a method for mounting a terminal on a cable. The cable comprises a core and an insulation coating surrounding the core. The cable may be processed by removing a portion of the insulation coating, such that the core projects from the leading end of the insulation coating. The method comprises positioning the terminal on the cable with respect to the longitudinal direction of the cable by bringing a positioning portion substantially in engagement with the cable, and crimping a barrel portion into connection with a portion of the cable.

These and other objects, features and advantages of the present invention will become more apparent upon a reading of the following detailed description and accompanying drawings.

DETAILED DESCRIPTION OF THE PREFERRED EMBODIMENTS

Figure 1:
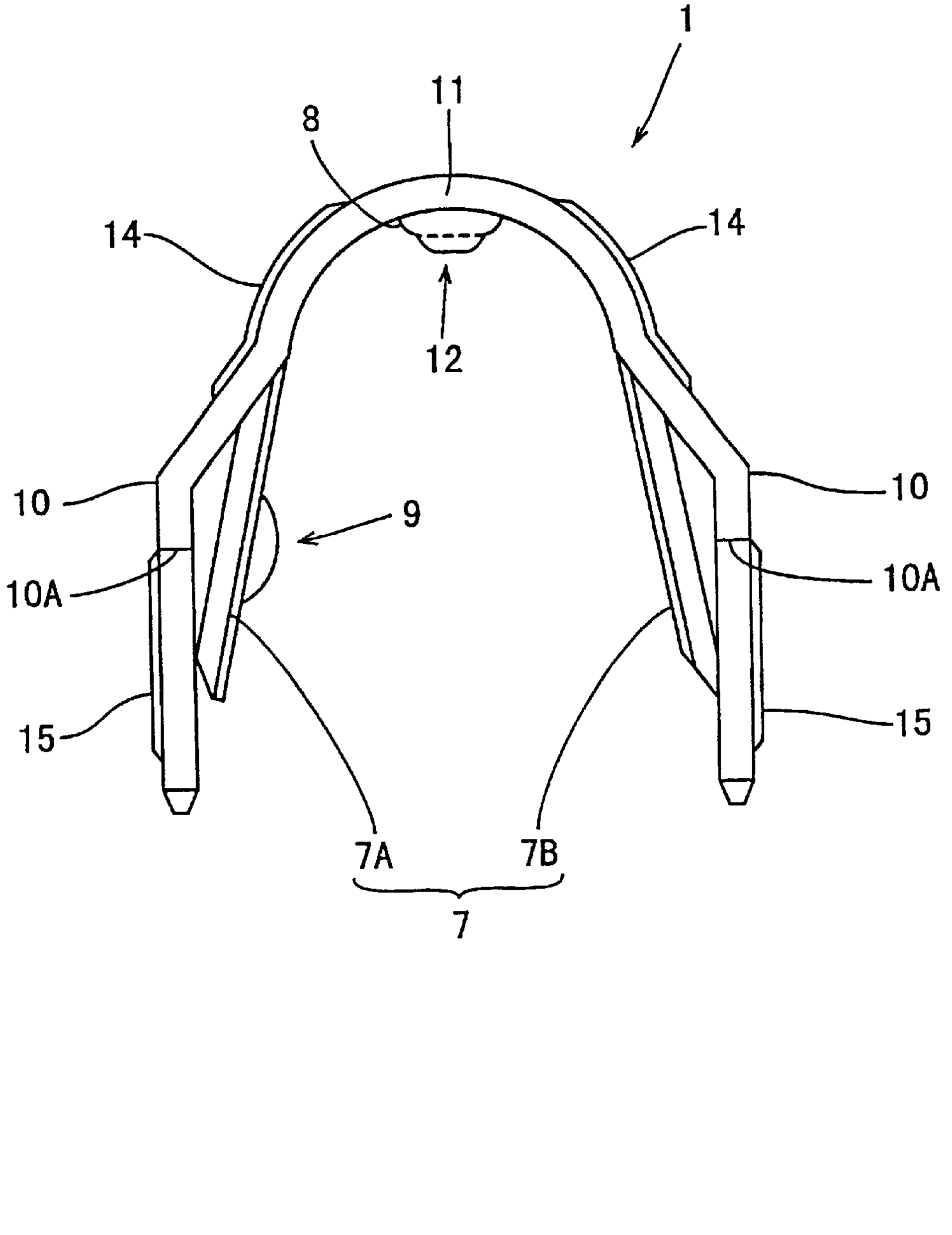
FIG. 1 is a front view of a terminal for a coaxial cable according to one embodiment of the invention.
Figure 2:
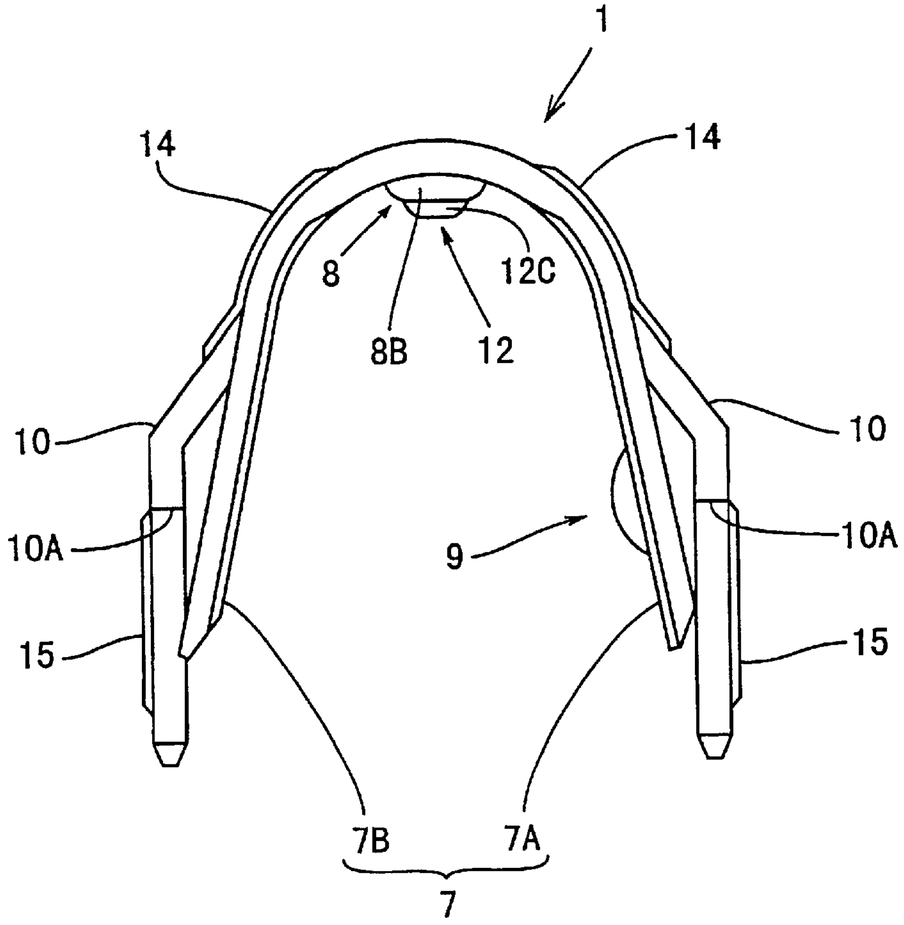
FIG. 2 is a rear view of the terminal.

A connector in accordance with the invention is described in detail with reference to FIGS. 1 to 9. The connector is used with a coaxial cable 2, which is described with reference to FIG. 7.

The coaxial cable 2 is comprised of four layers, including a core 3 that is substantially centered inside the cable 2. An inner insulation coating 4 surrounds the core 3, and a shield layer 5, formed by a braided wire, surrounds the inner insulation coating 4. An outer insulation coating 6 surrounds the shield layer 5 and defines the outermost side of the coaxial cable 2. These four layers 3 to 6 are substantially coaxially arranged. One end of the coaxial cable 2 is to be connected with a terminal 1 as described further below. A portion of the outer insulation coating 6 is stripped adjacent the end of the coaxial cable 2 to expose a section 5A of the braided wire 5. The exposed section 5A of the braided wire 5 is folded back at least partly, and preferably is held in substantially close contact with the outer surface of the outer insulation coating 6. Thus, a base end of the folded section 5A of the braided wire 5 preferably substantially coincides with the front end of the remaining outer insulation coating 6. An exposed section of the inner insulation coating 4 is stripped up to a predetermined position before the folded portion 5A, and the core 3 projects from a leading end 4A of the remaining inner insulation coating 4. The end of the coaxial cable 2 thus processed may be referred to as a stripped end or the front end in the following description.

The terminal 1 is illustrated in FIG. 1, and is formed e.g. by bending a press-cut piece of an electrically conductive plate material. The terminal 1 is to be mounted on the stripped end of the coaxial cable 2, and is formed substantially symmetrically with respect to the longitudinal axis of the coaxial cable 2. More particularly, the terminal 1 is provided at its rear side with a barrel 7 to be crimped or folded into connection with the folded section 5A of the braided wire 5. The barrel 7 is comprised of a pair of spaced apart transversely arranged fastening pieces 7A, 7B, which project at an angle different from 0° or 180°, and preferably substantially normal or downward with respect to a longitudinal direction of the terminal 1.

Figure 3:
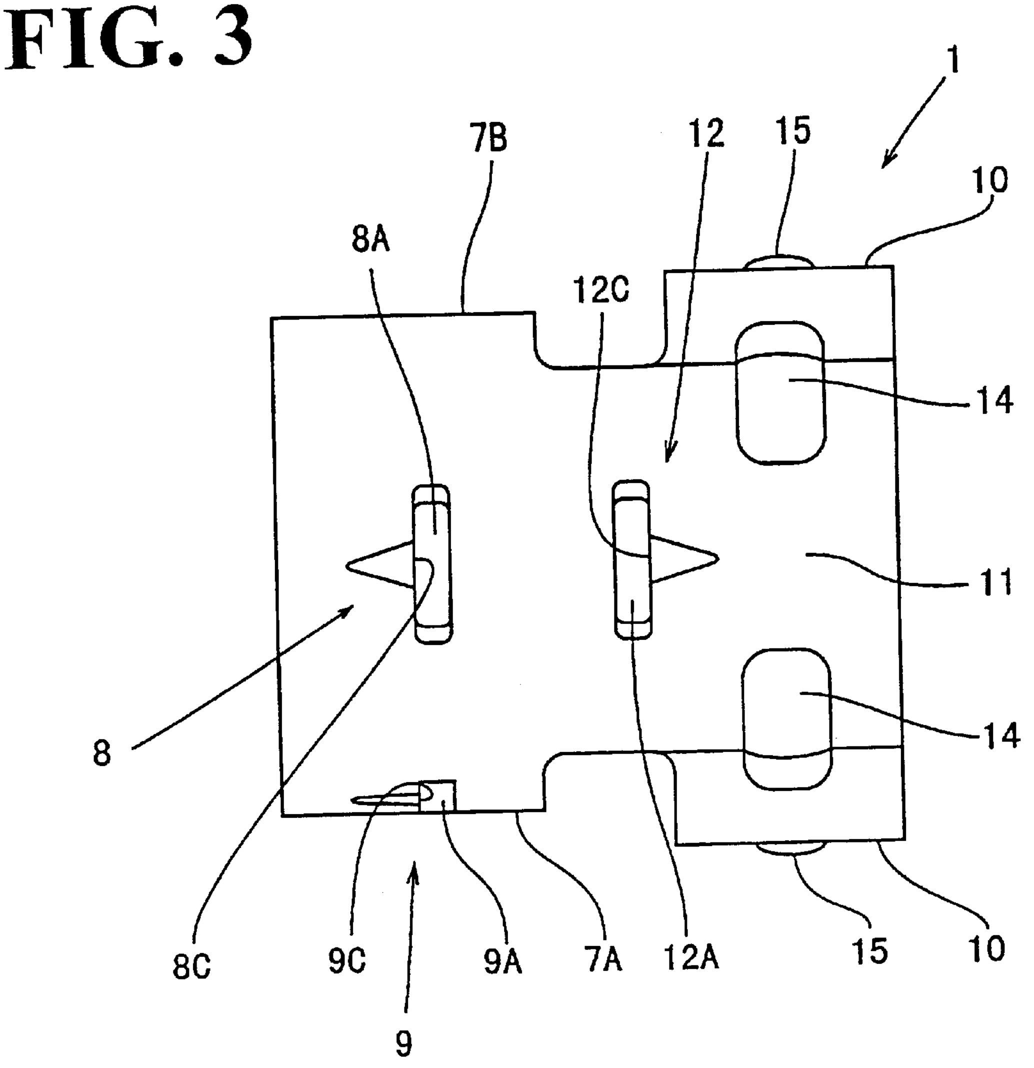
FIG. 3 is a plan view of the terminal.
Figure 4:
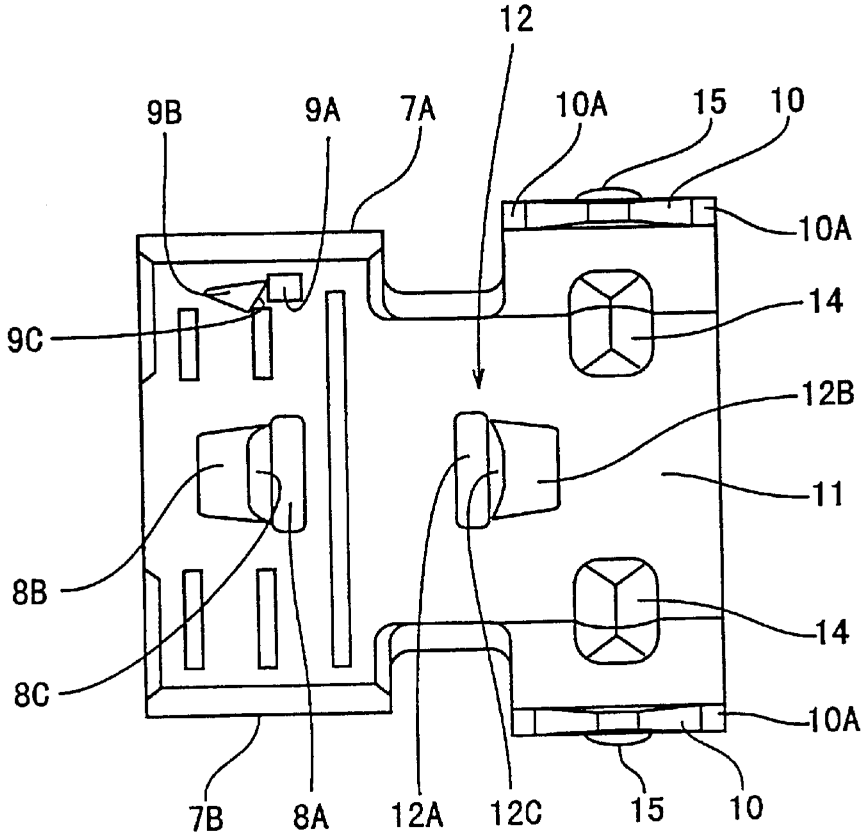
FIG. 4 is a bottom view of the terminal.
Figure 5:
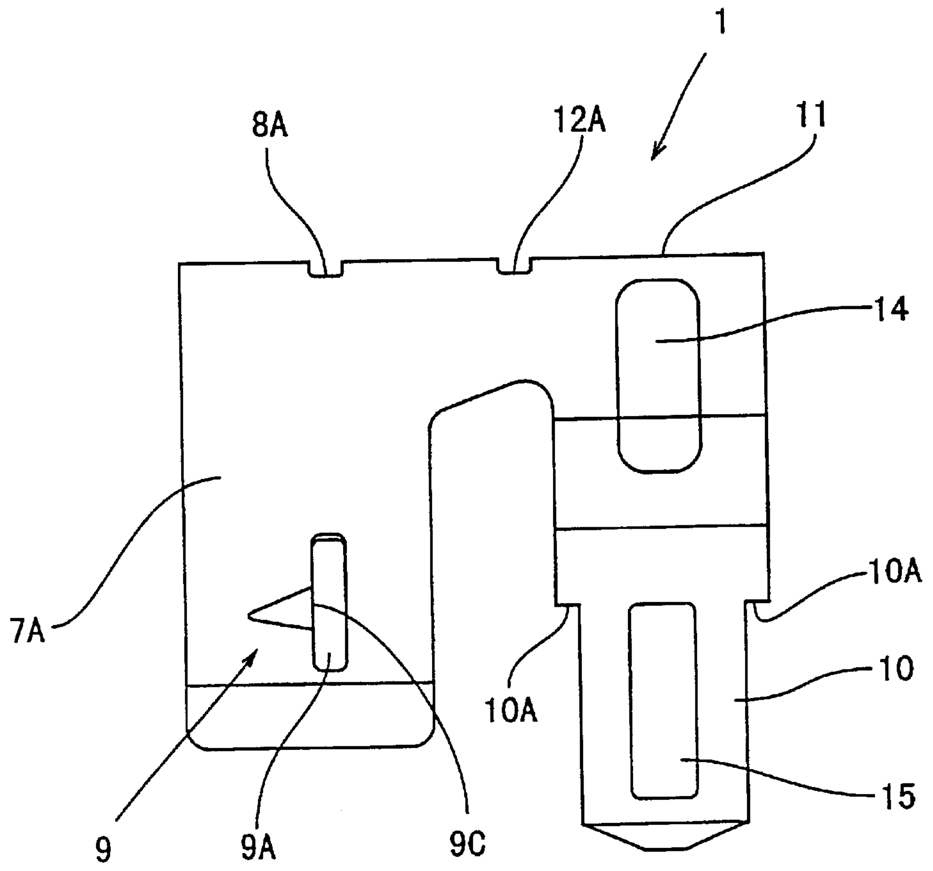
FIG. 5 is a side view of the terminal.
Figure 6:
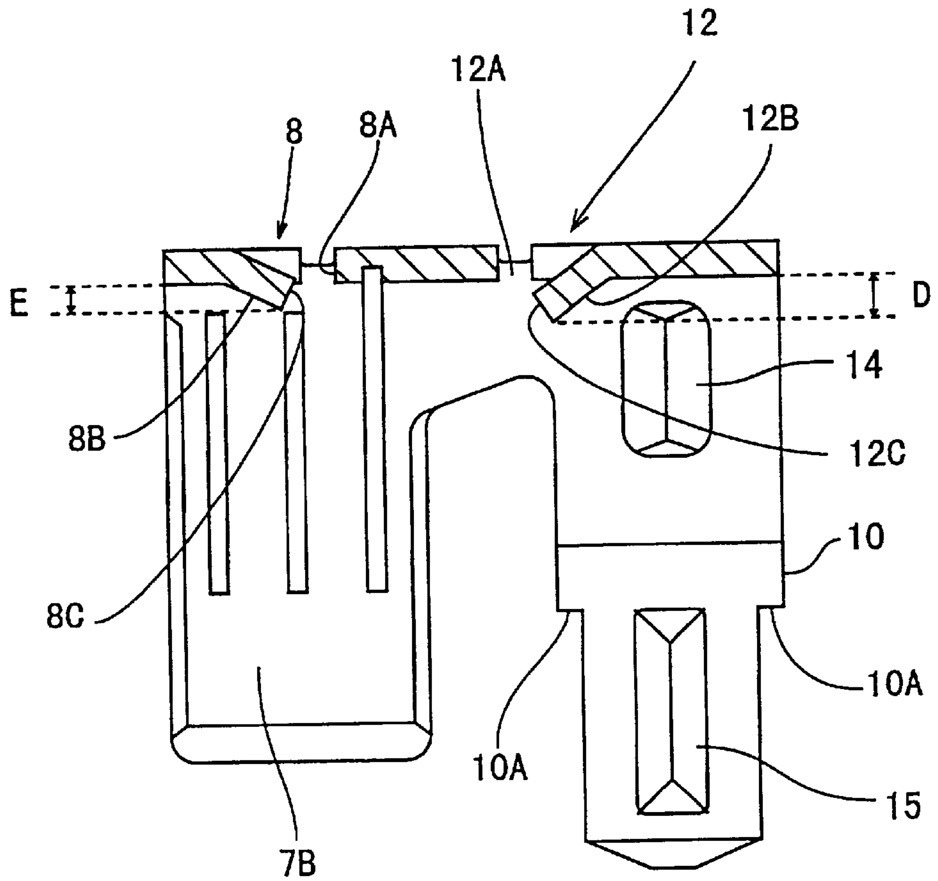
FIG. 6 is a side view in section of the terminal.

A biting portion 8 projects inward of the barrel 7 between the base ends of the fastening pieces 7A, 7B. The biting portion 8 is provided with a transversely extending slit or cut 8A and a slanted surface 8B in the form of an isosceles triangle, which is embossed behind the slit 8A to bulge inwardly. The front edge of the slanted surface 8B defines a locking edge 8C. When the biting portion 8 bites in or is inserted into the braided wire 5, the forwardly facing locking edge 8C restricts a backward displacement of the coaxial cable 2. Further, as shown in FIG. 3, the right fastening piece 7A (the lower fastening piece in FIG. 3) is formed with a biting portion 9 similar to the above-mentioned biting portion 8. Specifically, a cut 9A is formed at a front side of the biting portion 9, and a portion behind the cut 9A is embossed to bulge inwardly of the barrel 7 to define a slanted surface 9B. The front edge of the slanted surface 9B serves as a locking edge 9C. When the barrel 7 is crimped into connection with the coaxial cable 2, the right fastening piece 7A is crimped or folded first. At this time, both biting portions 8 and 9 hold the coaxial cable 2 in positions opposite to each other with respect to the core 3 of the coaxial cable 2.

A cover 11 is provided at a front half of the terminal 1, and is substantially continuous with the barrel 7. The cover 11 substantially covers portions of the inner insulation coating 4 and the core 3 preferably without being held in contact therewith when the terminal 1 is mounted on the coaxial cable 2. A positioning portion 12 is provided at a boundary (a position more toward the front than the center of the terminal 1) of the cover 11 and the barrel 7. The positioning portion 12 is comprised of a slit 12A that extends at an angle different from 0° or 180°, and preferably substantially transversely of the terminal 1. A slanted surface 12B is formed by embossing a portion before the slit 12A to bulge inwardly, and has a shape of an isosceles triangle. The positioning portion 12 further includes a locking edge 12C, which is a rear edge of the slanted surface 12B. This positioning portion 12 is shaped such that the locking edge 12C is substantially opposed to the locking edge 8C of the biting portion 8 of the barrel portion 7 (see in combination with FIG. 6). Here, a projecting height or distance D of the positioning portion 12 is greater than a projecting height or distance E of the biting portion 9. The biting portion 8 and the positioning portion 12 preferably are oriented substantially opposed to or facing each other. Thus the biting portion 8 and the positioning portion 12 are embossed or oriented such that the locking edge 8C is arranged after the slanted surface 8B in an insertion direction of the cable 2, whereas the locking edge 12C is arranged before the slanted surface 12B in the insertion direction.

Figure 8:
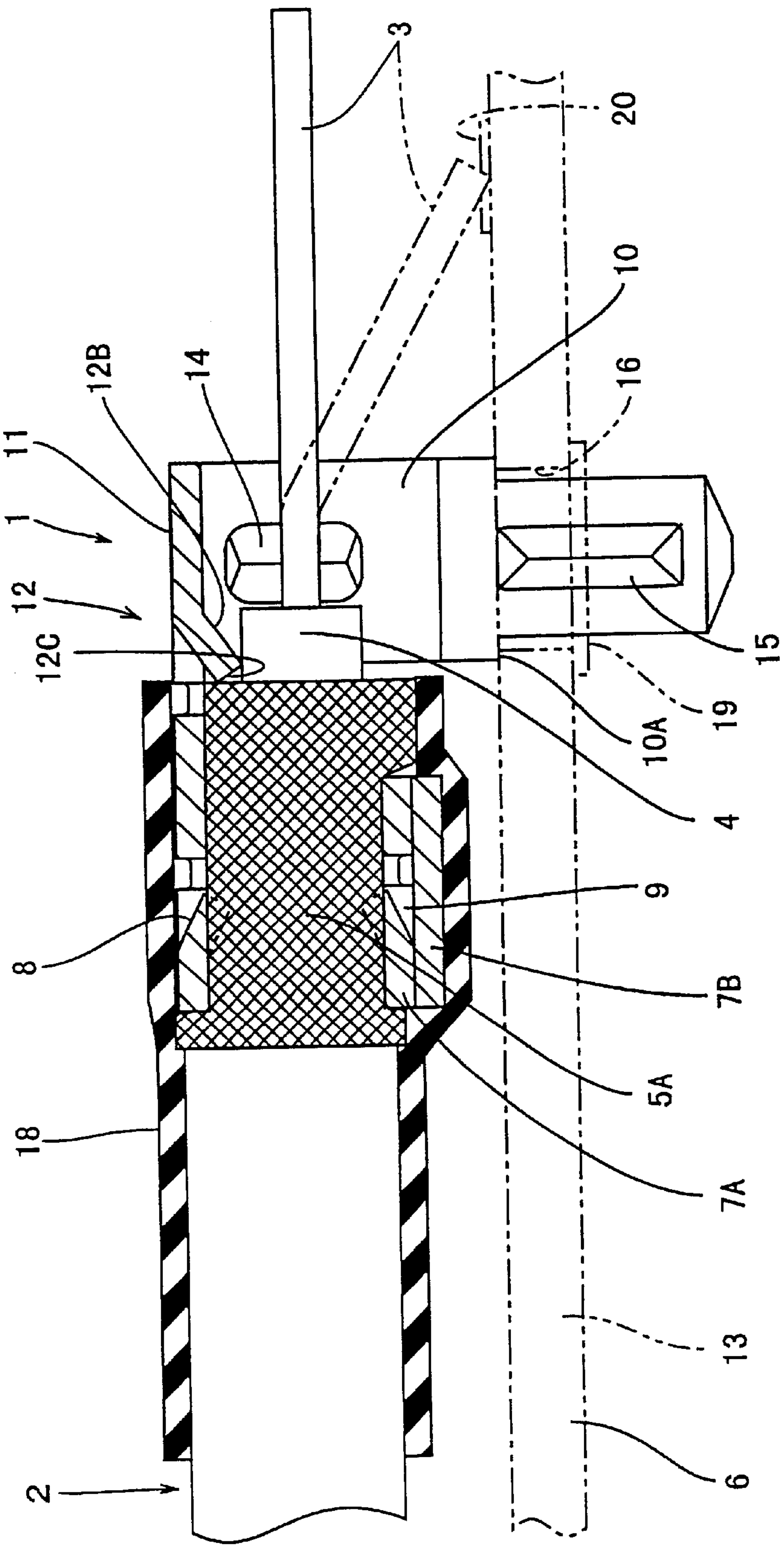
FIG. 8 is a side view in section when the terminal is mounted on the coaxial cable.

Legs 10 extend integrally or unitarily from substantially opposite lateral edges of the cover 11. The two legs 10 are insertable respectively into mount holes 16 of a printed circuit board 13 to secure the terminal 1 to the printed circuit board 13. Contacts 19, 20 are provided on the printed circuit board 13 near the edges of the mount holes 16 of the printed circuit board 13, as shown in FIG. 8. The contacts 19, 20 are in a position corresponding to where the core 3 is welded, and are connected with unillustrated circuits. Steps 10A are formed near the middle of each leg 10 with respect to a height direction of the legs 10. The steps 10A function to narrow a width of the respective legs 10 along forward/backward directions from the front and rear sides. The steps 10A are or can be brought substantially into contact with the upper surface of the printed circuit board 13 to position the terminal 1. Each leg 10 is formed with a vertically extending embossed portion 15 below the respective steps 10A to strengthen the leg 10 and preferably to lock the leg 10 in the corresponding mount hole 16 when the terminal 1 is mounted on the printed circuit board 13. Additionally, embossments 14 are formed at boundaries of the cover 11 and the legs 10 to strengthen the plate material.

Figure 7:
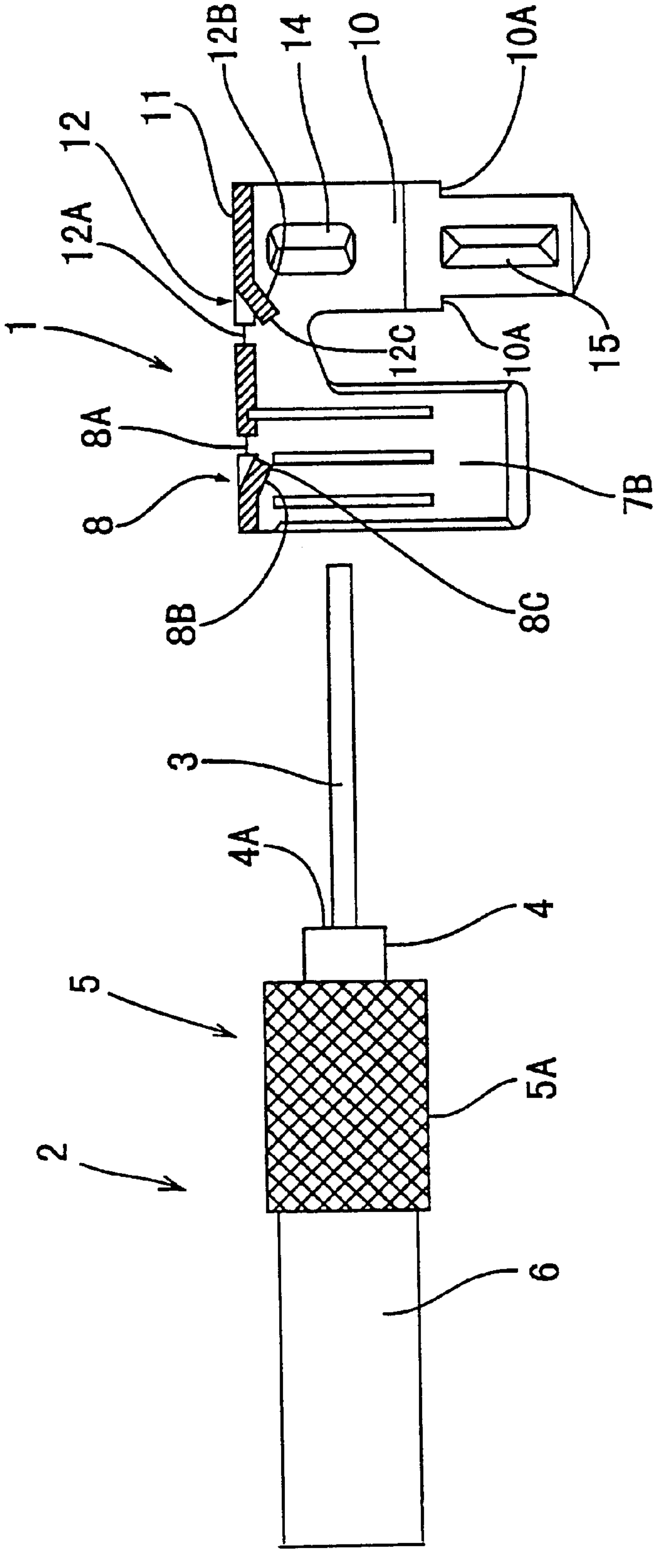
FIG. 7 is a side view showing a state before the terminal is mounted on the coaxial cable (the terminal is shown in sectional side view).
Figure 9:
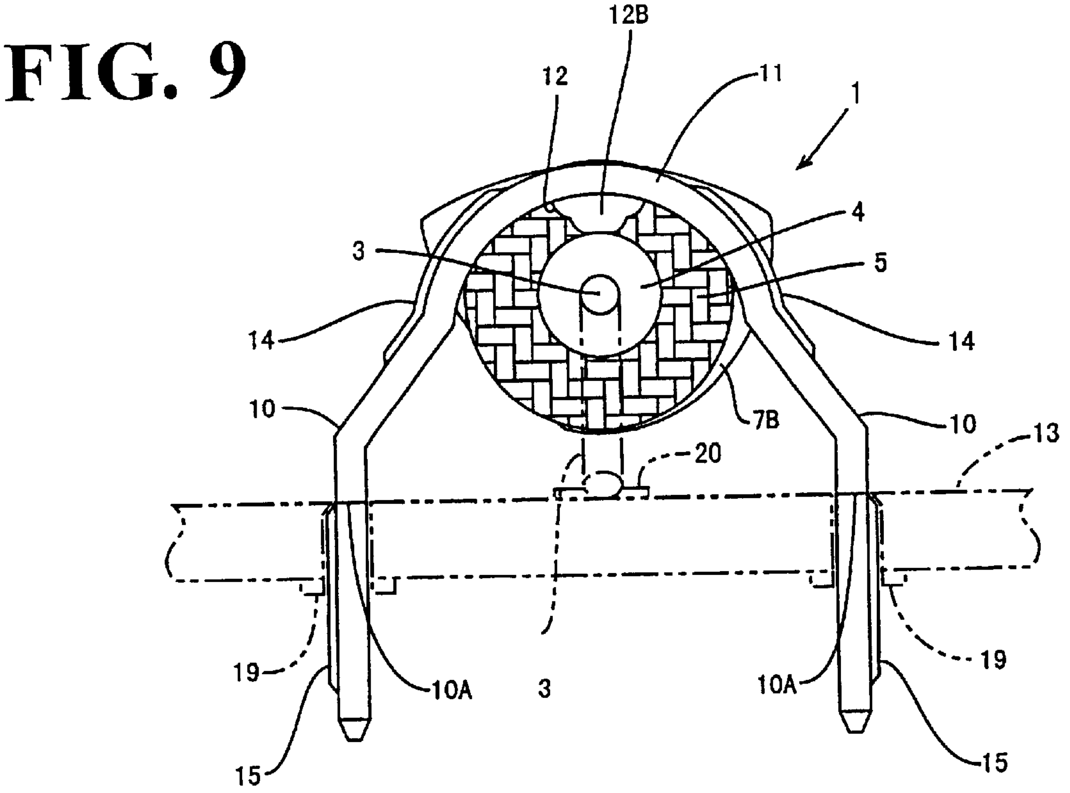
FIG. 9 is a front view when the terminal is mounted on the coaxial cable.

The action and effects of this embodiment thus constructed are described with reference to FIGS. 7 to 9.

First, heat shrinkable tubing 18 is fitted on the coaxial cable 2 in advance and is moved away from the stripped end. Then, as shown in FIG. 7, the stripped end is brought closer to the rear side of the barrel 7 of the terminal 1 while the coaxial cable 2 and the terminal 1 are supported in substantially straight alignment.

The coaxial cable 2 is pushed forward such that the front end of the folded section 5A (the front end of the outer insulation coating 6) is not brought into contact with the locking edge 8C of the biting portion 8. The locking edge 12C of the positioning portion 12 then comes into contact with the front end of the outer insulation coating 6, which is a starting position of the folded section of the braided wire 5, thereby preventing any further insertion of the coaxial cable 2. In this way, the terminal 1 can be automatically positioned on the coaxial cable 2 with respect to its longitudinal direction. At this time, since the locking edge 12C of the positioning portion 12 projects higher than the locking edge 8C of the biting portion 8, the coaxial cable 2 can be inserted smoothly without interference from the biting portion 8.

In this state, the barrel 7 is crimped into connection with the coaxial cable 2. First, the right fastening piece 7A is crimped into connection with the outer insulation coating 6 to surround the folded section 5A of the braided wire 5. The fastening piece 7B then is crimped to surround the right fastening piece 7A. At this time, the biting portions 8 and 9 bite in the braided wire 5 and lock the coaxial cable 2. As a result, the barrel 7 is better able to resist disengagement from the coaxial cable 2. After crimping the barrel 7 in the above manner, the cover 11 covers the core 3 without being held in contact therewith. As noted above, the heat shrinkable tubing 18 had been fitted on the coaxial cable 2 in advance. After the terminal 1 is mounted on the coaxial cable 2, the heat shrinkable tubing 18 is moved to cover the folded section 5A of the braided wire 5, and is shrunk by heating.

The legs 10 of the terminal 1 are mounted into the mount holes 16 of the printed circuit board 13 after the terminal 1 has been mounted on the end of the coaxial cable 2. More particularly, the leading ends of the legs 10 are connected to the contact 19 e.g. by being soldered, resistance welded or by ultrasonic welding or the like connection at the underside of the printed circuit board 13. Additionally, the core 3 is soldered after being bent to reach the contact 20 of the printed circuit board 13, as shown in FIG. 8.

As described above, the positioning portion 12 engages a front-end 6A of the outer insulation coating 6 of the coaxial cable 2 when the terminal 1 is mounted on the coaxial cable 2, thereby positioning the terminal 1 on the coaxial cable 2 with respect to the longitudinal direction of the coaxial cable 2. The barrel 7 then is crimped into connection with the folded section 5A in this state. Accordingly, the terminal 1 can be mounted stably in the predetermined position of the coaxial cable 2. Thus, the terminal 1 is stably mounted and the cover 11 substantially covers the core 3 over a predetermined length. As a result, an electrical capacity between the terminal 1 and the core 3 is stabilized to provide stable high frequency characteristics.

Further, the terminal 1 can be mounted easily on the printed circuit board 13 by providing the cover 1 1 with the leg portions 10.

Figure 10:
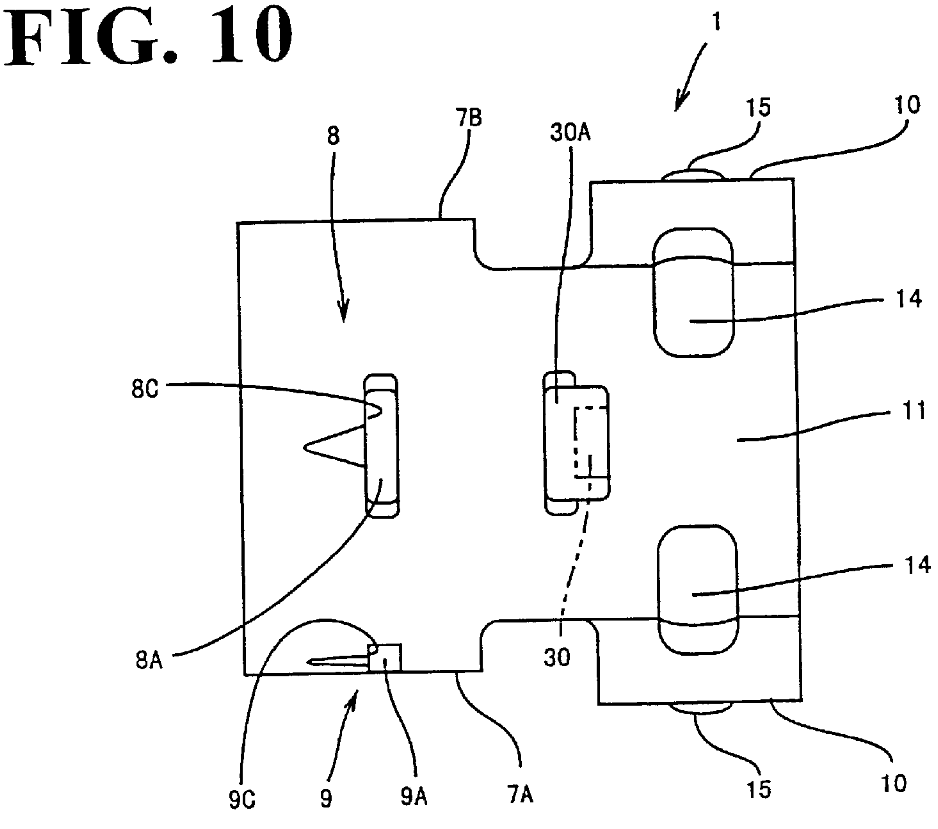
FIG. 10 is a plan view of the terminal according to another embodiment of the invention.
Figure 11:
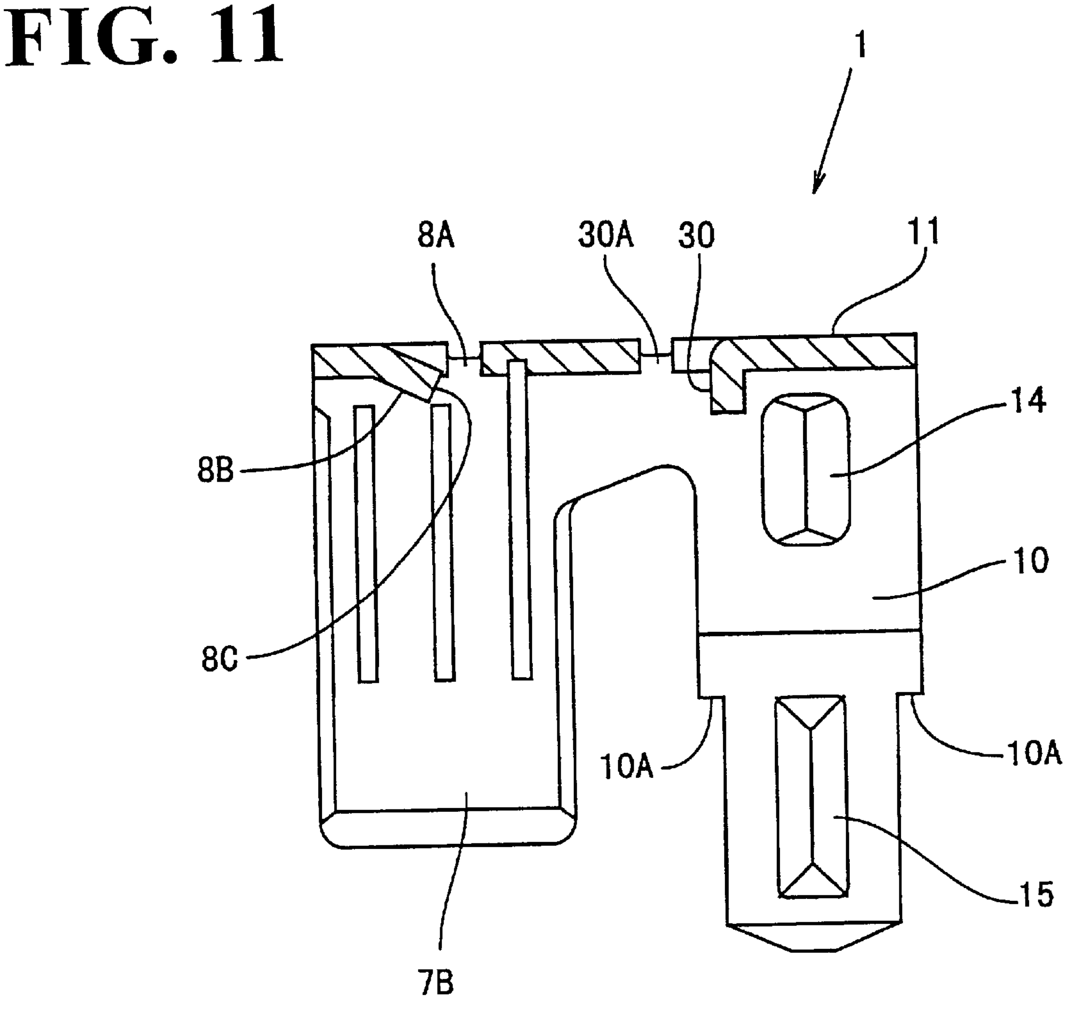
FIG. 11 is a side view in section of the terminal according to the another embodiment.
Figure 12:
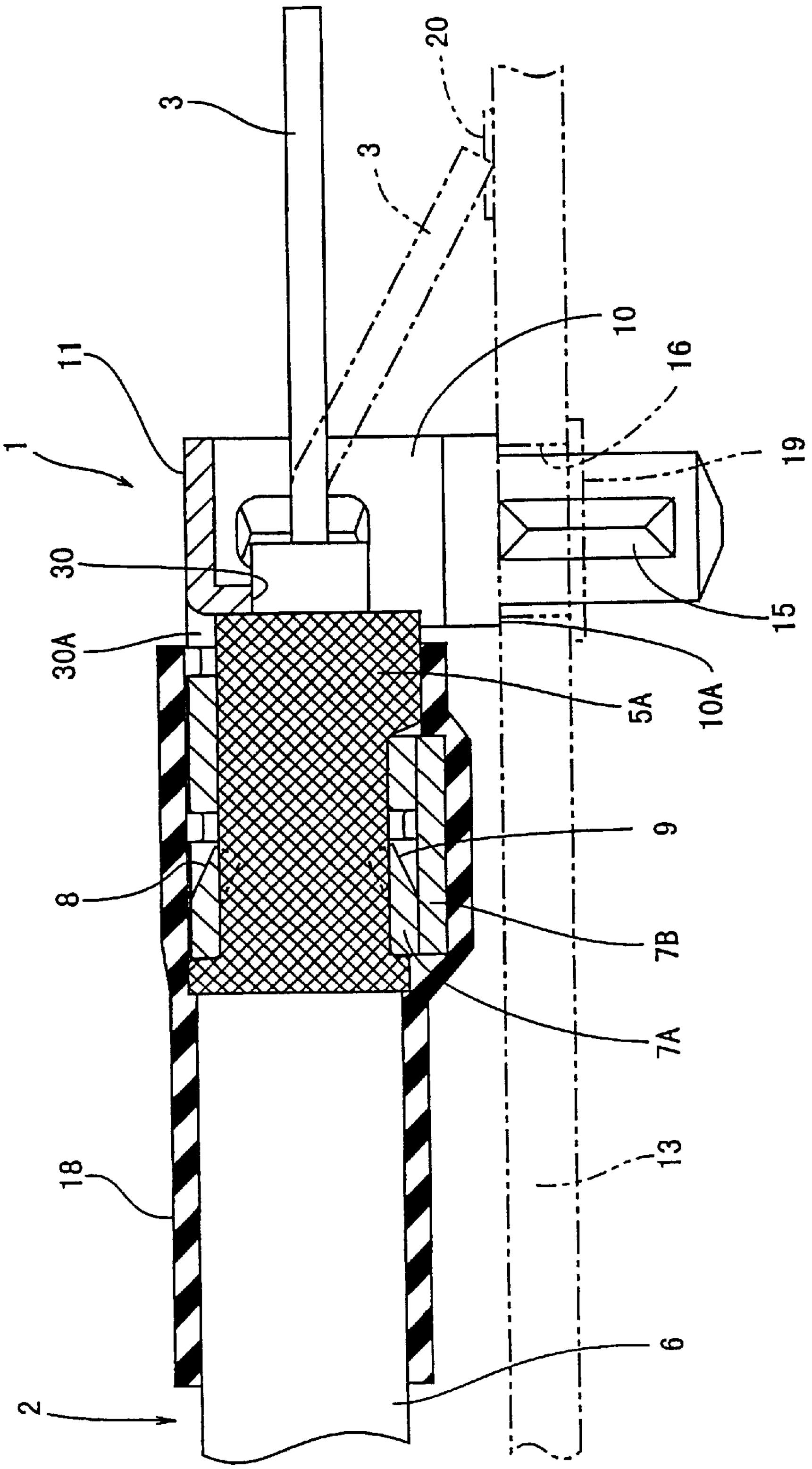
FIG. 12 is a side view when the terminal according to the another embodiment is mounted on the coaxial cable.

Another embodiment is described with reference to FIGS. 10 to 12. Elements that have the same or similar construction as the foregoing embodiment are identified by the same or similar reference numerals, and no detailed description of those elements is provided.

In this embodiment, a positioning portion 30 is formed with a C-shaped cut 30A (in FIG. 10, only a base portion 30B at the front end of the positioning portion 30 is connected with the cover portion 11, and the remaining three sides are spaced from the cover portion 11 by the cut 30A), and an inner side of the cut 30A is bent inwardly of the terminal 1. The positioning portion 30 is bent to a position where it is arranged at an angle different from 0° or 180°, preferably substantially perpendicular to the extension of the cover portion 11, so that it can be held in surface-contact with the front end 6A of the outer insulation coating 6 of the coaxial cable 2. Therefore, the coaxial cable 2 can be positioned more accurately.

The embodiment thus constructed has the same action and effects as the foregoing embodiment.

The present invention is not limited to the foregoing embodiments. For example, the following embodiment also is embraced by the technical scope of the present invention as defined in the claims.

Although the terminal 1 is provided with the legs 10 and the biting portions 8 and 9 in the respective foregoing embodiments, it is sufficient for the terminal to be provided with the barrel and the positioning portion according to the present invention. Either the legs or the biting portions may be added to such a terminal.

Although the invention has been described with reference to an embodiment in which the terminal 1 is mounted on a shielded cable, it is to be understood that the invention may be applied to a cable having a core and an insulation coating only.

Although the coaxial cable 2 has been described with reference to a shield layer 5 in the form of braided wires 5, it is to be understood that also other types of shield layers are possible e.g. those including alternatively or additionally a metal or conductive film.

What is claimed is:

1. A terminal mountable on a cable, the cable having an end and being comprised of core extending from the end, an inner insulation coating surrounding portions of the core spaced from the end such that the core projects from the inner insulation coating, a shield layer surrounding portions of the inner insulation coating such that an end portion of said inner insulation coating projects beyond the shield layer, an outer insulation coating surrounding portions of the shield layer such that the inner insulation coating projects beyond the outer insulation coating, the shield layer being folded away from the end and over the outer insulation coating to define an annular shield layer fold, the inner insulation coating projecting beyond the shield layer fold, the terminal comprising:

a barrel configured for crimped connection with a portion of the shield layer folded over the outer conductor;

a cover spaced outwardly from the core and extending continuously from the barrel a sufficient distance for covering at least a portion of the core; and a positioning portion disposed between the barrel and the cover and projecting inwardly a sufficient distance to be held substantially in engagement with the shield layer fold for positioning the terminal on the cable with respect to a longitudinal direction of the cable before the barrel is crimped into connection with the cable.

2. A terminal according to claim 1, wherein the cover is integrally formed with at least one leg for mounting the terminal on a printed circuit board.

3. A terminal according to claim 2, wherein the leg is provided with at least one embossed portion for strengthening the leg and/or for locking the leg in corresponding mount holes of the circuit board.

4. A terminal according to claim 3, wherein the leg is provided with stepped portions for engaging the circuit board upon insertion of the leg into a mount hole of the printed circuit board.

5. A terminal according to claim 1, wherein the barrel is formed with at least one inward projecting biting portion for biting into the cable.

6. A terminal according to claim 5, wherein the biting portion has a projecting height, and wherein the positioning portion has a projecting height, the projecting height of the biting portion being less than the projecting height of the positioning portion to prevent the biting portion from interfering with insertion of the cable into the terminal.

7. A terminal according to claim 6, wherein the biting portion and the positioning portion are arranged substantially opposing to each other along an insertion direction of the cable into the terminal.

* * * * *